J. S. WILSON.
CONDUIT.
APPLICATION FILED DEC. 27, 1909.

1,020,672.                                    Patented Mar. 19, 1912.

Inventor:
James S. Wilson,
By Wright Brown Quimby May
Attys.

Witnesses:
J. P. Roulstone
E. Batchelder

UNITED STATES PATENT OFFICE.

JAMES S. WILSON, OF CHELSEA, MASSACHUSETTS.

CONDUIT.

1,020,672. Specification of Letters Patent. Patented Mar. 19, 1912.

Application filed December 27, 1909. Serial No. 535,109.

*To all whom it may concern:*

Be it known that I, JAMES S. WILSON, of Chelsea, in the county of Suffolk and State of Massachusetts, have invented certain new and useful Improvements in Conduits, of which the following is a specification.

In the use of conduits for wires, after the conduits have been placed in position in a building, or elsewhere, it is the practice to run a fish, so called, comprising a long strip of flexible wire through the conduit. Thereafter, the end of a cord, or other drawing means, is secured to the fish and drawn through the conduit. The end of the wire to be drawn into the conduit is then secured to this cord and pulled into the conduit. Considerable delay and time is required for the insertion of the fish into the conduit and getting the cord in place ready to draw the wire. By my invention this difficulty is overcome, since I construct the conduit with a fish or cord loosely connected to its interior wall, extending the length of the conduit so that wherever the conduit is cut, one end of this fish or cord can be seized, the union between the cord or fish member and the interior wall of the conduit being only sufficient to keep the cord in place and to offer no practical resistance to a pull on the cord.

Figure 1:
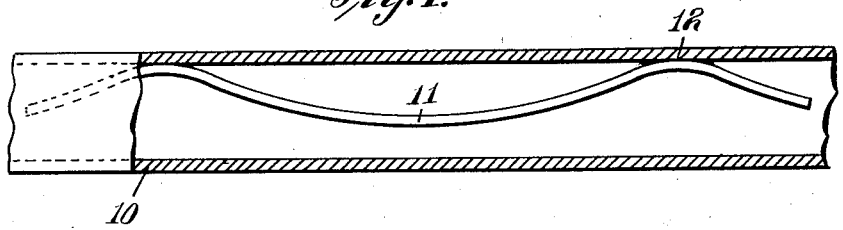
Figure 2:
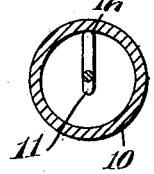
Figure 7:
Figure 3:
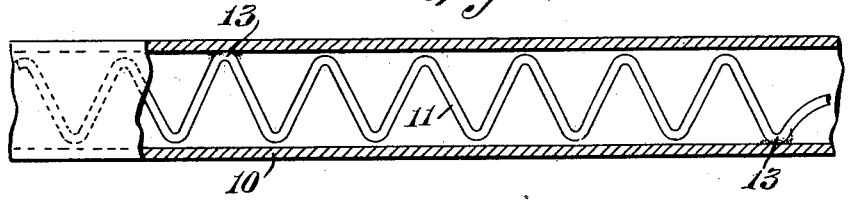
Figure 4:
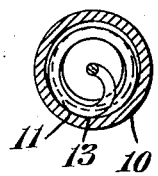
Figure 8:
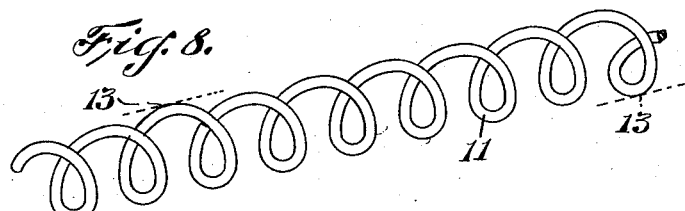
Figure 5:
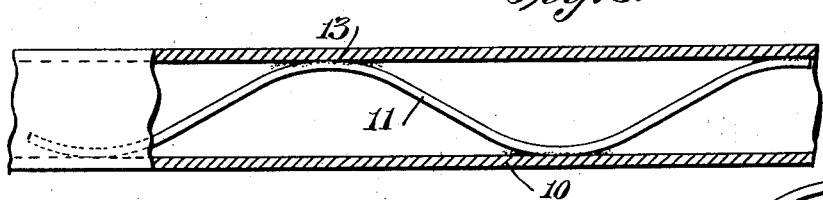
Figure 6:
Figure 9:
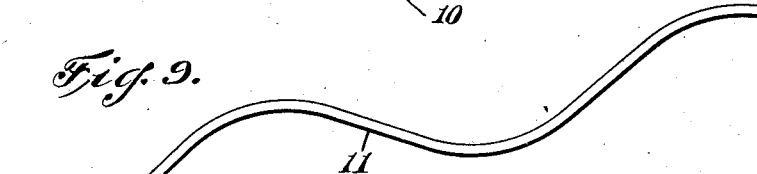

Figure 1 is a longitudinal sectional view of a conduit constructed in accordance with my invention, showing the cord or fish member secured at intervals to the top of the conduit and arranged in the conduit in the form of sags or loops. Fig. 2 is a cross-sectional view of the same. Fig. 3 is a view similar to Fig. 1, showing the fish member arranged in the conduit to form an elongated helix, the helix at some of its points engaging the walls of the conduit. Fig. 4 is a cross-sectional view of the construction shown in Fig. 3. Fig. 5 is a view similar to Fig. 1, showing the cord or fish member arranged in the conduit in the form of loops, some of the alternate bends being secured to the wall of the conduit. Fig. 6 is a cross-sectional view of the construction shown in Fig. 5. Fig. 7 is a detail view of the cord or fish member arranged as in Fig. 1. Fig. 8 is a detail view of the fish or cord member as arranged in Fig. 3. Fig. 9 is a detail view of the fish or cord member as arranged in Fig. 5.

10 represents a conduit, which may be of any preferred material, such as metal, fiber, composition, and of any preferred construction, such as rigid, flexible, or having simple or compound walls. The conduit shown here is shown merely in a conventional way for the purpose of illustrating the invention.

11 represents a cord or fish member adapted to be arranged in the conduit at the time of manufacture and maintained against accidental displacement by contact against the walls of the conduit, or by any other means. This result could be secured by having the fish member 11 arranged in the form of a loose helix, as shown in Fig. 3, the turns of the helix at one or more points engaging the walls of the conduit to maintain the member 11 against accidental displacement. The fish member may be arranged as shown in Fig. 1, in the form of loose loops, separably connected at one or more points, as 12, by any mechanical means, such as stitching, or the application of an adhesive substance. In Fig. 5, still another method is shown of arranging the fish member where the wire is bent in the same plane and the bends, as at 13, at one or more points, engage the walls of the conduit sufficiently to prevent accidental displacement. A sinuous form of the fish member, that is to say, either the helical form shown in Figs. 3, 4, and 8, or the wavy form shown in the other figures, is desirable, since it enables the fish member to bear advantageously on, and separably engage the wall of the conduit. When the fish member is of helical form, or when it has its undulations formed to bear simultaneously on opposite sides of the conduit wall, as shown by Figs. 5 and 6, a frictional resistance is set up between the fish member and the conduit, tending to prevent endwise displacement of the fish member.

The foregoing are merely illustrations of the idea and are not intended to show all the ways in which the fish member may be maintained in the conduit. When it is desired to use a conduit after it is put in place, the wire to be pulled through, if it be a small one, can be secured to the member 11 and readily pulled through, the member 11 leaving the walls of the conduit on a direct pull. If the wire be too large for the strength of the member 11, the member 11 can be used to draw through a pulling rope.

Having thus explained the nature of my invention and described a way of constructing and using the same, though without attempting to set forth all of the forms in which it may be made, or all of the modes of its use, what I claim and desire to secure by Letters Patent is:—

1. A conduit and a longitudinally extending fish member located within the conduit and engaged with the wall of the conduit to prevent accidental longitudinal displacement of the fish member, and permit its endwise movement by the application of force.

2. A conduit and a longitudinally extending fish member located within the conduit, and having a sinuous form whereby it engages the wall of the conduit.

In testimony whereof I have affixed my signature, in presence of two witnesses.

JAMES S. WILSON.

Witnesses:
H. L. ROBBINS,
P. W. PEZZETTI.

---

Copies of this patent may be obtained for five cents each, by addressing the "Commissioner of Patents, Washington, D. C."